United States Patent
Zhang et al.

(10) Patent No.: US 6,665,440 B1
(45) Date of Patent: Dec. 16, 2003

(54) SYSTEM AND METHOD FOR PERFORMING CORNER GUIDED CURVE MATCHING OF MULTIPLE IMAGES REPRESENTING A SCENE

(75) Inventors: Zhengyou Zhang, Redmond, WA (US); Ying Shan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 09/583,062

(22) Filed: May 30, 2000

(51) Int. Cl.⁷ .................................................. G06K 9/62
(52) U.S. Cl. ......................... 382/209; 382/154; 382/199
(58) Field of Search ................................ 382/103, 154, 382/159, 181, 195, 199, 201–203, 206, 209, 216–218, 220, 254, 285, 291; 345/418, 419; 348/42, 51, 169; 356/12

(56) References Cited

U.S. PATENT DOCUMENTS

| | | | | |
|---|---|---|---|---|
| 5,309,522 A | * | 5/1994 | Dye | 382/154 |
| 5,311,305 A | * | 5/1994 | Mahadevan et al. | 348/169 |
| 5,432,712 A | * | 7/1995 | Chan | 382/191 |
| 6,278,798 B1 | * | 8/2001 | Rao | 382/154 |
| 6,356,659 B1 | * | 3/2002 | Wiskott et al. | 382/209 |

OTHER PUBLICATIONS

Cohen, et al "Invariant Matching and identification of curves using B–splines curve representation", IEEE, pp. 1–10, 1995.*
Fan, et al "matching 3–D objects using surface descriptions", IEEE, pp. 1400–1406, 1988.*
Nasrabadi "a stereo vision technique using curve–segments and relaxation matching"IEEE, pp. 566–572, 1992.*
Weng, et al "Matching two perspective views", IEEE, pp. 806–825, 1992.*
Horaud, et l. "Stereo correspondence through feature grouping and maximal cliques", IEEE, pp. 1168–1180, 1989.*
Deriche, et al. "2–D curve matching using high curvature points application to stereo vision", IEEE, pp. 240–242, 1990.*
Nasrabadi, et al "Stereo vision correpondence using a multi–channel graph matching technique", IEEE, pp. 1804–1809, 1988.*
Nassif, et al. "Robust real–time corner location measurement", IEEE, pp. 106–111, 1997.*
Bachnak, et al "Matching of stereo image pairs for industrial vision systems", IEEE, pp. 303–306, 1989.*
William J. Christmas, Josef Kittler, and Maria Petrou. Structural matching in computer vision using probabilistic relaxation. IEEE Trans. PAMI, 17(8): 749–764, Aug. 1995.
Stephen B. Pollard, John E.W. Mayhew, and John P. Frisby. Implementation Details of the PMF Stereo Algorithm.

* cited by examiner

*Primary Examiner*—Daniel G. Mariam
(74) *Attorney, Agent, or Firm*—Lyon & Harr, LLP; Richard T. Lyon

(57) ABSTRACT

The present invention is embodied in a curve matching system and method that is guided by a set of matched corners. The corner guided curve matching produces a geometrical representation of the scene from the images, which can be used for any suitable application, such as computer and stereo vision applications. In general, first, multiple images depicting a scene are digitally received by the system. The images are graphical images digitally received and processed. For example, the images can be two dimensional image data, such as bitmap or raster image data. Curves of the images are then matched to correlate the two images of the scene for creating three dimensional (3D) curve information, such as 3D vector or mathematical information, of the scene. This 3D vector information can then be used in any suitable manner, for example, to digitally reconstruct the scene for stereo vision applications.

23 Claims, 4 Drawing Sheets

SYSTEM AND METHOD FOR PERFORMING CORNER GUIDED CURVE MATCHING OF MULTIPLE IMAGES REPRESENTING A SCENE

BACKGROUND OF THE INVENTION

1. Field of the Invention

The present invention relates in general to processing digital data, and in particular, to a system and method for performing corner guided curve matching of multiple images representing a scene for stereo vision applications.

2. Related Art

For stereo vision applications, accurate vector or mathematical representations of objects or scenes derived from two dimensional image data are very important. Vector or mathematical representations of a scene can be comprised of, for example, corner and curve information of an image. Typically, corners and curves are important image features in many vision-based applications. Corners are usually more stable and easier to match than curves, while curves contain richer information of scene structure. In prior systems, corners were often used to recover the epipolar geometry between two views, which was then used in curve matching to reduce the search space. However, information of the scene structure contained in this set of matched corners was typically ignored.

Corners are 2D image points where the image intensity surface has the highest curvatures. Detected corners are usually stable. That is, corners across views corresponding to the same physical point in the 3D world can usually be consistently detected despite different perspective distortions. Current corner matching techniques such as robust estimation and gradient disparity limit allow high rates of correct matching for many real applications.

However, although, corner features are usually used to compute the camera motion because of reliability of their matching, they are not suitable for the scene reconstruction. First, the set of corners is usually very sparse, and only provides a very coarse representation of the scene structure. Second, corners are usually not available along curves, but the curves contain very rich information of the scene structure. In one example, a reconstructed scene can be represented by a Delaunay triangle mesh textured by an original reference image. The vertexes of the triangles can be matched corners and each triangle can be considered as a flat surface. Therefore, the Delaunay triangles can span across the surface boundaries, making visual appearance of the scene structure unrealistic.

Therefore, what is needed is a system and method that solves the problems that prior methods encounter with corner matching with a system that performs corner guided curve matching for scene reconstruction. What is also needed is a system the uses the relaxation framework to progressively reduce the matching.

SUMMARY OF THE INVENTION

To overcome the limitations in the prior art as described above and other limitations that will become apparent upon reading and understanding the present specification, the present invention is embodied in a curve matching system and method that is guided by a set of matched corners. The corner guided curve matching produces a geometrical representation of the scene from the images, which can be used for any suitable application, such as computer and stereo vision applications.

In general, first, multiple images depicting a scene are digitally received by the system. The images are graphical images digitally received and processed. For example, the images can be two dimensional image data, such as bitmap or raster image data. Curves of the images are then matched to correlate the two images of the scene for creating three dimensional (3D) curve information, such as 3D vector or mathematical information, of the scene. This 3D vector information can then be used in any suitable manner, for example, to digitally reconstruct the scene for stereo vision applications.

In particular, the present invention integrates corner matches into curve matching procedures. In particular, within a probabilistic framework, the role of the corner guidance is explicitly defined by a set of similarity-invariant unary measurements and by a similarity function. The similarity function provides stronger capability of resolving matching ambiguity than the epipolar constraint, and is integrated into a relaxation scheme to reduce computational complexity and improve accuracy of curve matching.

The present invention exploits the corner matching constraint and the local similarity constraint to provide stronger guidance for curve matching. The present invention operates within a probabilistic relaxation framework and the role of the corner guidance is explicitly defined by a set of similarity-invariant unary measurements and a similarity function. The unary measurements may also include conventional quantities such as the intensity in the neighborhood, orientation, and the local shape characteristics. Also, a set of uncertainty measurements for the unary measurements can be used to compute an optimal unary measurement for the complete curve. These measurements are related to the distance from a corner to a curve, and are used to control the impact of corner guidance on curve matching. The similarity function between two curves is then defined in this high dimensional measurement space.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Exemplary Operating Environment

Figure 1:
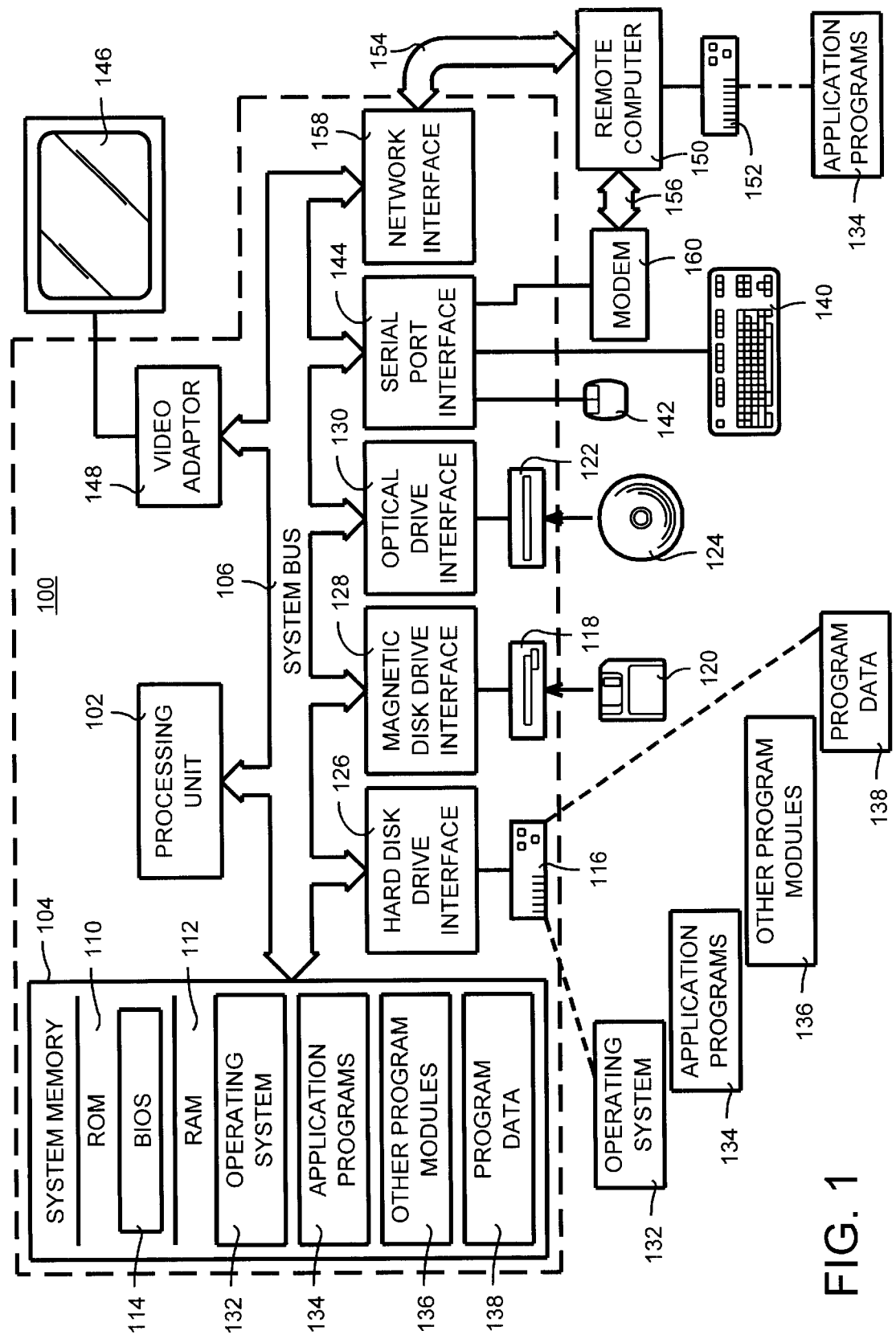
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system 114 (BIOS), containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide nonvolatile storage of computer readable instructions, data structures, program modules and other data for the personal computer 100. Although the exemplary environment described herein employs a hard disk, a removable magnetic disk 120 and a removable optical disk 124, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136, and program data 138. A user may enter commands and information into the personal computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device. It will be appreciated that the network connections shown are exemplary and other means of establishing a communications link between the computers may be used, such as a direct connection via an integrated services digital network (ISDN) connection.

II. Introduction

Reliable corner guided curve matching of images representing a scene is important and desirable in many vision-based applications. The present invention provides reliable corner guided curve matching of multiple images representing scenes. Corner guided curve matching in accordance with the present invention produces a geometrical representation of the scene from the images, which can be used for any suitable application, such as computer and stereo vision applications.

In general, the present invention can be embodied in a computer hardware or software system that performs corner guided curve matching within a probabilistic relaxation framework. Similarity-invariant unary measurements suitable for corners and curves are computed.

III. General Overview

Figure 2:
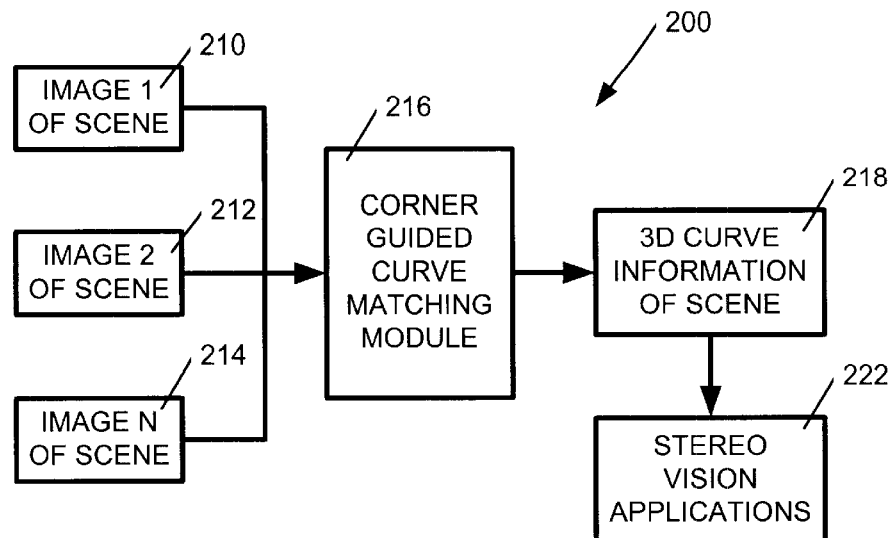
FIG. 2 is a general block diagram illustrating a system processing multiple images of a scene for stereo vision applications in accordance with the present invention.

FIG. 2 is a general block diagram illustrating a corner guided curve matching system for processing multiple images of a scene in accordance with the present invention. The system 200 can be used for any suitable computer application, such as computer or stereo vision applications. In general, image 1, image 2, . . . , image N (210, 212, 214) depicting a scene are digitally received by the system 200. The images (210, 212, 214) can be graphical images taken by a camera and containing two dimensional image data of the scene, in any suitable format, such as bitmap or raster image data format.

A corner guided curve matching module 216 receives the images (210, 212, 214) and correlates the images to each other by matching the corners of the images (210, 212, 214). The matched corners of the images represent geometrical three dimensional (3D) corner and curve information 218, such as 3D vector information, of the scene. This 3D vector information geometrically represents the scene and can be used in any suitable manner, for example, to digitally reconstruct the scene for stereo vision applications 220.

The present invention reliably performs corner guided curve matching for a scene given at least two images of the scene. The present invention solves the problems discussed above that prior methods encounter with corner matching with a system that performs corner guided curve matching for scene reconstruction. The corner guided curve matching of the present invention is preferably performed within a probabilistic relaxation framework. The relaxation framework is used to progressively reduce the matching ambiguity and will be discussed in detail below.

Figure 3:
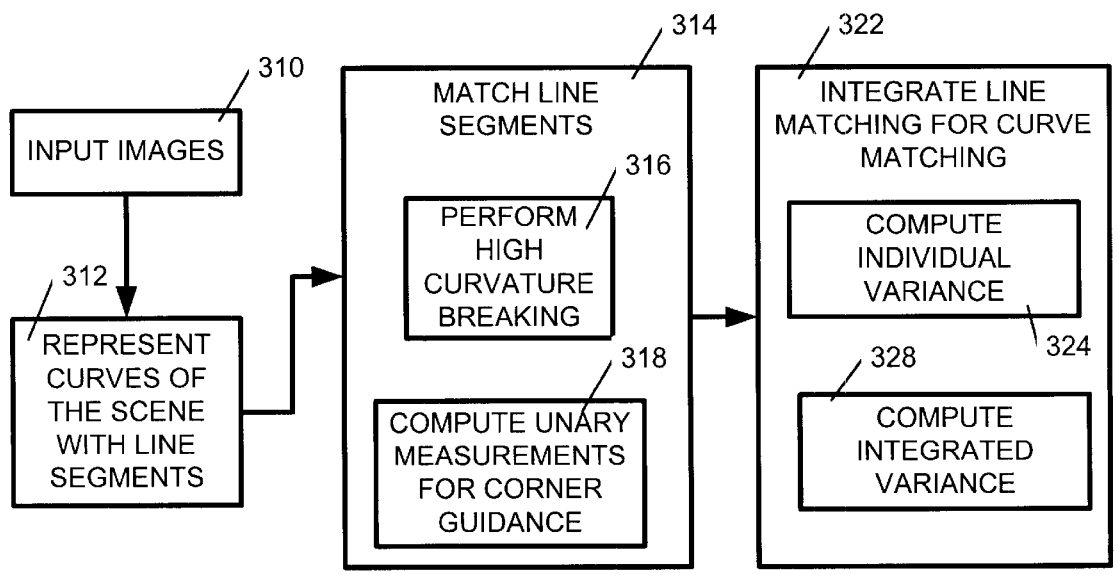
FIG. 3 is a flow diagram for curve matching multiple images of a scene in accordance with the present invention.

FIG. 3 is a flow diagram for performing corner guided curve matching of multiple images of a scene in accordance with the present invention. In general, referring to FIG. 2 along with FIG. 3, first, images (210, 212, 214) are received by the system (step 310). The images (210, 212, 214) are graphical images, such as two dimensional bitmap or raster image data. Second, corners of the images (210, 212, 214) are represented as line segments (step 312) and the line segments are matched (step 314).

With regard to the line segments, preferably, a piecewise linear model is used to approximate curves with the line segments. High curvature breaking (step 316), as discussed in detail below and in FIG. 7 can be used to ensure that the unary measurements are computed with a curve approximated by a piece-wise linear model. The line segments of the images (210, 212, 214) are matched by computing unary measurements (steps 318). These unary measurements reflect the impact of corner guidance on the curve matching. The relaxation framework of the present invention deals with corners and curves and explicitly models the uncertainty in the unary measurements. For example, a set of unary measurements for the line segments can be computed, which are similarity-invariant and measured in the same physical space. The set of unary measurements are then integrated to provide a set of unary measurements and a similarity function for the complete curve.

Last, the uncertainty in the combined unary measurements is progressively modeled for reducing ambiguities in the combined unary measurements by integrating line matching for corner guided curve matching (step 322). Namely, criteria of the line matching is integrated into the criteria of curve matching. This is accomplished by first computing an individual variance or uncertainty of combined unary measurements for matched line segments of each curve (step 324). A global minimal variance criterion is then used to compute the integrated variance for the entire curve based on the individual variance of each matched line segment (step 328), which will be discussed in detail below.

IV. Operation

Referring back to FIG. 2 along with FIG.3, the corner guided curve matching system and method of the present invention can be used to enhance and provide stronger guidance for curve matching. For example, in curve matching, epipolar geometry can be used to reduce the search space. The epipolar constraint states the fact that, given a point p in one image, its corresponding point in the other image must lie on a line $l_p$, known as the epipolar line. All curves intersecting with $l_p$ could be candidate matches for the curve on which point p lies. In some cases for curve matching, the epipolar lines are horizontal scan lines. When the image pair is taken by cameras with more general configuration, the epipolar geometry is usually computed from a set of matched corners. The recovered epipolar geometry can then be used in curve matching. The matched corner sets can be more useful for curve matching. The matched corner set gives a one-to-one mapping from a corner point p in one image to a corner point p' in the other image, which is stronger than the point-to-line mapping given by the epipolar constraint. The mapping given by the matched corner set will be referred to as the corner matching constraint.

The major difference between the epipolar constraint and the corner matching constraint is that the latter is sparse and is only defined on the points in the matched corner set. In general, since the criterion and the process used to detect corners and edge points are different, these two types of features are unlikely to be overlapped. As such, it is improbable that a corner point lies on a curve. Nevertheless, it is reasonable to assume that corner points can usually be found near a curve. Since object surfaces are usually continuous at least in a small neighborhood, a local affinity or similarity constraint can be used to describe the relationship of a corner and a curve.

The present invention exploits the corner matching constraint and the local similarity constraint to provide stronger guidance for curve matching. The present invention is described within a probabilistic relaxation framework, and the role of the corner guidance is explicitly defined by a set of similarity-invariant unary measurements and a similarity function. The unary measurements may also include conventional quantities such as the intensity in the neighborhood, orientation and the local shape characteristics, for example, as described in "Automatic line matching across views" CVPR'97, pages 666–671, 1997, by Cordelia Schmid and Andrew Zisserman; "Segment-based stereo matching", CVGIP, 31:2–18, 1985, by G. Medioni and R. Nevatia; and "A stereo vision technique using curve-segments and relaxation matching", IEEE PAMI, 14(5): 566–572, 1992, by Nasser M. Nasrabadi, respectively, all of which are incorporated herein by reference.

In addition, a set of uncertainty measurements for the unary measurements are described. These measurements are related to the distance from a corner to a curve, and are used to control the impact of corner guidance on curve matching. The similarity function between two curves is then defined in this high dimensional measurement space.

V. Working Example and Real World Implementation

Figure 4:
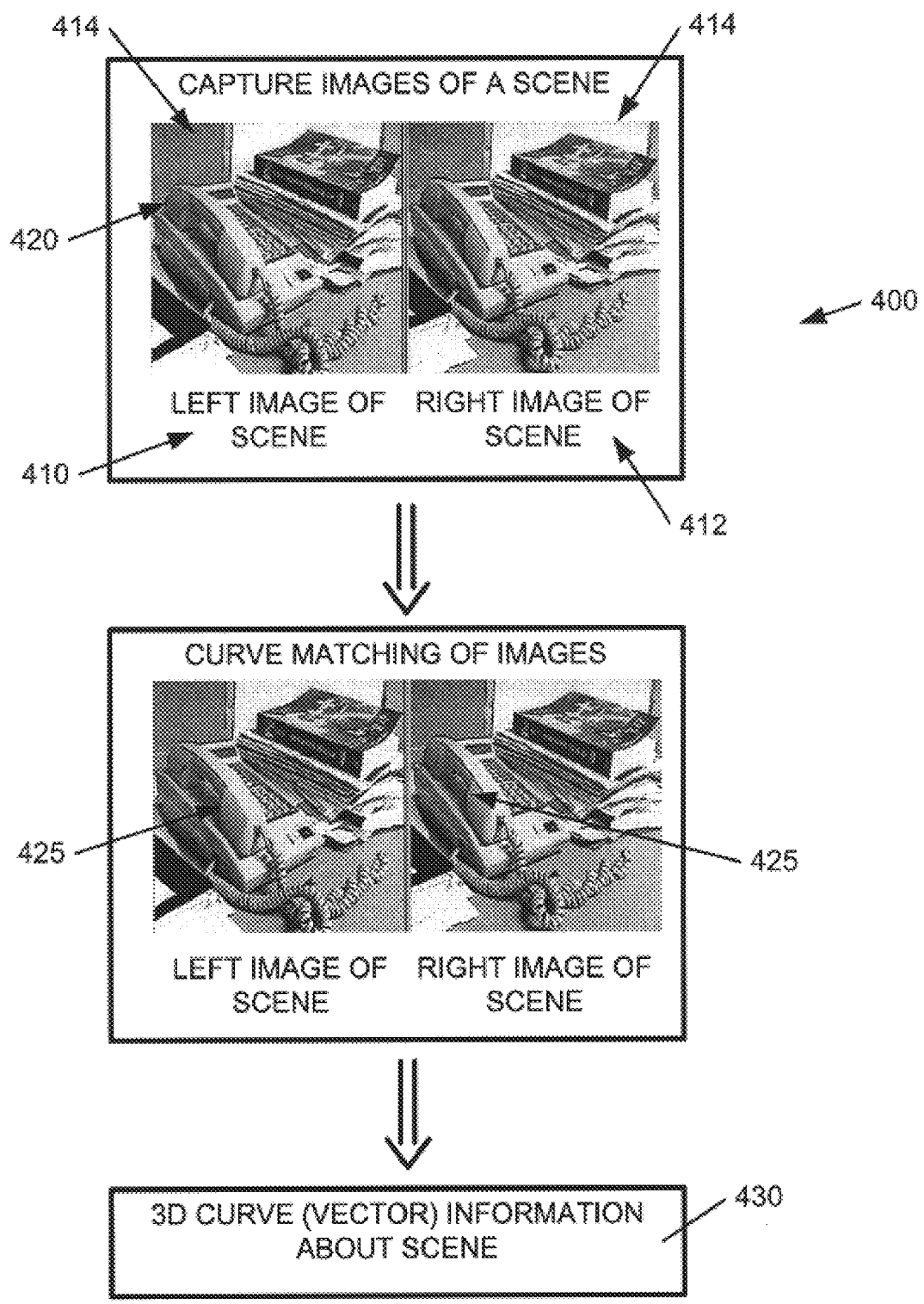
FIG. 4 is a working example of FIG. 3 for curve matching two images of a scene in accordance with the present invention.

FIG. 4 is a working example of FIG. 3 for corner guided curve matching of two images of a scene in accordance with the present invention. In the example 400, in general, a left image 410 and a right image 412 of a scene 414 are captured by any suitable means. Corners 420 of each image 410, 412 defining the objects of the scene 414 are matched with the corner guided curve matching module 216 of FIG. 2. The matched corners 425 are used to determine a geometrical representation of the scene 414 in the form of curve information 430, which can be used for stereo matching applications.

A. A Probabilistic Relaxation Framework

A probabilistic relaxation framework for structural matching is used by the present invention. For notational purposes, curve matching is modeled as a labeling problem from the object space (left image 410) to the model space (right image 412). There are N curves in the left image, and M in the right. The curves in the left image form the object space, denoted by $A=\{a_1, \ldots, a_N\}$. The curves in the right image form the model space, each labeled as $\omega_j$. As discussed above, the object 410 is matched to the model 412. Thus, assigned to each object, $a_i$ is a label $\theta_i$, which may take as its value any of the M+1 model labels that form the set $\Omega=\{\omega_0, \omega_1, \ldots, \omega_M\}$, where $\omega_0$ is the null label used to label curves for which no match in the right image is appropriate. Four sets of indices are defined for convenience as:

$$N_0=\{1,\ldots,N\}, N_i=\{j\ |j\in N_0, j\neq i\},$$
$$M_0=\{0,\ldots,M\}, \text{and } M_i=\{j\ |j\in M_0, j\neq i\}$$

The unary measurement set is defined as $X=\{x_i|i\in N_0\}$ where $x_i$ is the unary measurement vector for the object $a_i$. Unary measurements include intensity similarity, and will be addressed below. The binary measurement set for the object $a_i$ is defined as $A_i=\{A_{ij}|j\in N_i\}$, where $A_{ij}$ is the vector of binary measurements between objects $a_i$ and $a_j$. Binary measurements include distance between two curves, and will be discussed below. A special measurement set $B_i=\{B_{ij}|j\in N_i\}$ is also defined, where $B_{ij}$ is the uncertainty measurement to be defined later. Upper-case P is used to denote the probability of an event, lower-case p is used to denote the probability density function, and $N_v(\mu,\Sigma)$ to denote the Gaussian probability density function of a random vector v with the mean $\mu$ and the covariance matrix $\Sigma$.

1. A Framework of probabilistic relaxation:

With the above notation, the matching problem becomes that of finding for object $a_i$ a model label $\omega_{\theta_i}$ with the highest probability given the measurements X, and $A_i$:

$$P(\theta_i = \omega_{\theta_i} | X, \mathcal{A}_i) = \max_{\omega_\lambda \in \Omega} P(\theta_i = \omega_\lambda | X, \mathcal{A}_i) \quad (1)$$

it follows that:

$$P(\theta_i = \omega_{\theta_i} | X, \mathcal{A}_i) = \frac{P(\theta_i = \omega_{\theta_i} | x_i) Q(\theta_i = \omega_{\theta_i})}{\sum_{\omega_\lambda \in \Omega} P(\theta_i = \omega_\lambda | x_i) Q(\theta_i = \omega_\lambda)} \quad (2)$$

where the support function is given by $$Q(\theta_i = \omega_\alpha) = \prod_{j \in N_i} \sum_{\omega_\beta \in \Omega} P(\theta_j = \omega_\beta | x_j)\, p(A_{ij} | \theta_i = \omega_\alpha, \theta_j = \omega_\beta) \quad (3)$$

where the first item in the summation is the similarity function, and the second is the compatibility function.

Based on (2), the labeling probability in a relaxation scheme is updated according to the following iterative equation $$p^{(n+1)}(\theta_i = \omega_\alpha) = \frac{P^{(n)}(\theta_i = \omega_{\theta_i}) Q^{(n)}(\theta_i = \omega_{\theta_i})}{\sum_{\omega_\lambda \in \Omega} P^{(n)}(\theta_i = \omega_\lambda) Q^{(n)}(\theta_i = \omega_\lambda)} \quad (4)$$

where n is the iteration number, and $P^{(0)}(\theta_i=\omega_{\theta_i}) = P(\theta_i=\omega_{\theta_i}|x_i)$. The iteration process terminates if the change in the probabilities is less than a predefined small value or the maximum number of iterations is reached. Details of the relaxation scheme, binary measurements, and compatibility function are described in more detail in U.S. patent application Ser. No. 09/584013, filed concurrently herewith, by Zhang et al., and assigned to the same assignee, entitled "A SYSTEM AND METHOD FOR MATCHING CURVES OF MULTIPLE IMAGES REPRESENTING A SCENE", which is incorporated herein by reference.

Additional details can be found in "Structural matching in computer vision using probabilistic relaxation", IEEE PAMI, 17(8): 749–764, August 1995, by William J. Christmas, Josef Kittler, and Maria Petrou; "On the foundations of relaxation labeling process", IEEE Trans. PAMI, 5(3): 267–286, May 1983, by R. A. Hummel and S. W. Zucker; and "Combining evidence in probabilistic relaxation", Int'l J. Pattern Recognition and Artificial Intellegent, 3:29–51, 1989, by J. Kittler and E. R. Hancock, all of which are incorporated herein by reference.

As can be seen from equations (3) and (4), the computational complexity of the relaxation procedure is proportional to $NS_n S_c^2$, where $S_n$ is the average number of neighboring curves and $S_c$ is the average number of candidate curves in the right image for each curve $a_i$ in the left image. If all other objects are regarded as neighbors and all models are regarded as candidates, relaxation will be extremely slow.

To reduce the computational complexity, only objects within a certain distance to $a_i$ are selected. However, it is more difficult to reduce the number of candidate curves. The Epipolar constraint is used for this purpose. The number of candidate curves can be reduced further, e.g., by a factor of 6, which means that the relaxation can be accelerated by a factor of 36. As a result of reducing the number of candidate curves, matching ambiguity is also reduced, resulting in more accurate curve matching.

2. Adapted framework with combined measurements

In the present invention, the unary measurements depend on information in both object and model space (i.e., left and right image). Therefore, measurements for combined object-model pairs are considered. For example, $x_i^{(\alpha)}(a \in M_0)$ are the combined unary measurement defined for the pair of the $i$th object and the $\alpha$th model. The unary measurement of object $a_i$, $x_i$, is then itself a set of combined unary measurements, i.e, $\{x_i^{(\alpha)}|\alpha \in M_0\}$.

In order to adapt the framework for working with the combined measurements, consider the similarity function in (3) first. Since the event $\theta_j=\omega_\beta$ add does not depend on the combined unary measurements other than the $x_j^{(\beta)}$, it follows:

$$P(\theta_j=\omega_\beta|\{x_j^{(\beta)}\in M_0\}) = P(\theta_j=\omega_\beta|x_j^{(\beta)})$$

substituting the above equation into (3), (3) into (2), equation (2) can be rewritten as $$P(\theta_i = \omega_{\theta_i} | X, \mathcal{A}_i) = \frac{P(\theta_i = \omega_{\theta_i} | x_i^{(\theta_i)}) Q(\theta_i = \omega_{\theta_i})}{\sum_{\omega_\lambda \in \Omega} P(\theta_i = \omega_\lambda | x_i^{(\lambda)}) Q(\theta_i = \omega_\lambda)}$$

and equation (3) can be rewritten as $$Q(\theta_i = \omega_\alpha) = \prod_{j \in N_i} \sum_{\omega_\beta \in \Omega} P(\theta_j = \omega_\beta | x_j^{(\beta)})\, p(A_{ij} | \theta_i = \omega_\alpha, \theta_j = \omega_\beta) \quad (5)$$

B. The Combined Unary Measurement And The Similarity Function

The impact of the corner matching constraint can be naturally reflected in the similarity function in equation (5). The unary measurements discussed in this section are those related to the matched corner set. Other unary measurements are also possible, but are not discussed in this section.

In order to efficiently compute combined unary measurements, a curve is approximated by a set of line segments connected by equally separated seed points. Seed points in the right image are obtained by intersecting the epipolar lines of the left seed points with the curve in question. This approximation is accurate enough provided that an edge chain is broken at high curvature points, and that seed points are not very far from each other. A corner is the neighbor of a curve if its distance to the curve is less than a predefined threshold. The distance from a corner to a curve is defined by the minimum distance from the corner to the midpoints of all line segments on the curve. The combined unary measurements for each line segment, to be described shortly, are computed. They are then grouped together in an optimal way to form the combined unary measurements for curves.

1. Similarity function

According to Bayes' theorem, the similarity function in equation (5) can be written as $$P(\theta_i = \omega_\alpha \mid x_i^{(\alpha)}) = \frac{p(x_i^{(\alpha)} \mid \theta_i = \omega_\alpha)\hat{P}(\theta_i = \omega_\alpha)}{\sum_{\omega_\lambda \in \Omega} p(x_i^{(\alpha)} \mid \theta_i = \omega_\lambda)\hat{P}(\theta_i = \omega_\lambda)} \quad (6)$$

where $\hat{P}(\theta_i = \omega_\lambda)$ is the prior probability equal to a pre-fixed value $\zeta$ if $\lambda=0$ (i.e., no match), and to $(1-\zeta)/M_0$ otherwise. The unary measurements are used in equation (6) to compute $P(\theta_i = \omega_\alpha \mid x_i^{(\alpha)})$. It is then used to initialize the relaxation scheme, that is: $P^{(0)}(\theta_i = \omega_\alpha) = P(\theta_i = \omega_\alpha \mid x_i^{(\alpha)})$. The likelihood function $p(x_i^{(\alpha)} \mid \theta_i = \omega_\alpha)$ will be discussed below.

The unary measurements of the present invention are similarity invariant. As a result, there is no need to introduce a motion related term for the computation of the similarity function.

2. Combined Unary Measurements for line segments

Figure 5:
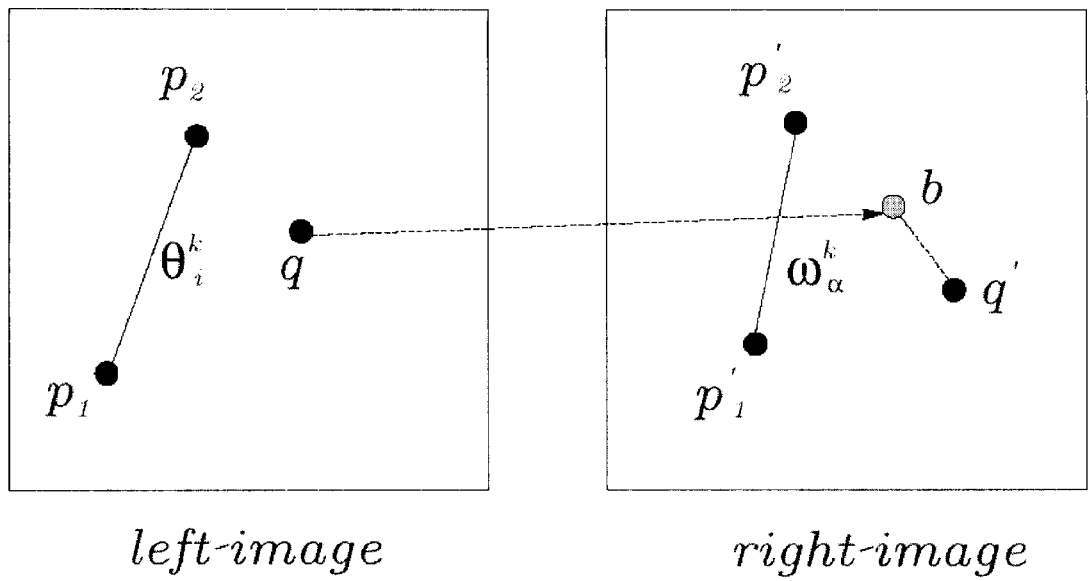
FIG. 5 is a configuration of a pair of line segments and a pair of corners in both images.

It is assumed that the mapping from a neighborhood in one image to the corresponding neighborhood in the other can be approximated by a local similarity transformation. With this assumption, a pair of line segments and a pair of corners are considered, as illustrated in FIG. 5. The similarity transformation $x' = sR_\theta x + t$ can be computed from $(p_1, p_2')$ and $(p_2, p_2')$, as described below.

Specifically, a similarity transformation is of the following form:

$$x' = \begin{bmatrix} c & -s \\ s & c \end{bmatrix} x + \begin{bmatrix} t_1 \\ t_2 \end{bmatrix}$$

If two pairs of matched points exists $(p_1, p_1')$ and $(p_2, p_2')$, $\{c, s, t_1, t_2\}$ can be solved linearly.

Next, $b = sR_\theta q + t$ is computed and forms a random vector $z$ as follows $$z = [v^{(x)}, v^{(y)}] \quad (7)$$

where $v = b - q'$. If the local similarity transformation is valid and the point coordinates are noise-free, $z=0$. Typically, these conditions are not satisfied in practice, and thus, it is assumed that the components of z are independent and identically distributed (i.i.d.), and have the same standard deviations $\sigma$, i.e., $z = N_z(0, \sigma^2 I_2)$, where $I_2$ is the 2×2 identity matrix.

There are several advantages of the unary measurements z given in equation (7). First, measurements are invariant under the similarity transformation. Second, the set of unary measurements is complete. Under similarity transformation, a pair of line segments and a pair of corners have 6 equations, and there are 4 degrees of freedom for the similarity transformation. Therefore, the number of invariants is equal to 2, and hence, the same number of measurements exists. Third, measurements are evaluated in the same physical space, namely, they are quantified in pixels in the second image. This means that only one $\sigma$ is needed for all the measurements, the computation which is given below in section 4.

3. Combined Unary Measurements for curves and the likelihood function

Now a pair of curves $\theta_i$ and $\omega_\alpha$ is considered. For each neighboring corner of $\theta_i$, the closest segment is selected, and measurement $z_k$ as defined in equation (7) is computed. The rationale of choosing the closest line segments is that the similarity transformation better applies to a small neighborhood than to a larger one. For the vector set $\{z_j \mid j \in [1, \ldots, k]\}$, where k is the number of the neighboring corners, the following measurement vector $$\tilde{z} = \zeta_1 z_1 + \ldots + \zeta_k z_k \quad (8)$$

is considered where $\zeta_k$'s are coefficients and $\Sigma_{k=1}^k \zeta_k = 1$. From this, $\tilde{z}$ is also a joint Gaussian with $\tilde{z} = N_z(0, \tilde{\sigma}^2 I_2)$, where $\sigma$ is given by $$\tilde{\sigma}^2 = \zeta_1^2 \sigma_1^2 + \ldots + \zeta_k^2 \quad (9)$$

The element $\zeta_j$ is selected to minimize equation (9), which yields $$\varsigma_i = \left[ \sigma_i^2 \sum_{j=1}^K \sigma_j^{-2} \right]^{-1}$$

Equation (8) is an unbiased estimate of the measurement error with minimal variance. The likelihood function in (6) is then given by $$p(x_i^{(\alpha)} \mid \theta_i = \omega_\alpha) = p(\tilde{z} \mid \theta_i = \omega_a) = N_{\tilde{z}}(0, \tilde{\sigma}^2 I_2) \quad (10)$$

where $x_i^{(\alpha)} = \tilde{z}$ is the combined unary measurements.

4. The distance between segments and the standard deviation

The standard deviation $\sigma$ of vector z in equation (8) should be a function of the distance d between the corner and the line segment in question. This is because the local similarity assumption becomes weaker when d becomes larger. The function that is used is $$\sigma(d) = \frac{p}{\sqrt{2\pi}} \left[ (1-\gamma)\left(1 - e^{-\frac{d^2}{\tau^2}}\right) + \gamma \right] \quad (11)$$

where $p = \min(W, H)$, W and H are respectively the image width and height, $\tau$ is a positive scalar that controls the range within which the guidance from neighboring corner is effective, and $\gamma = \sqrt{2\pi}\sigma^0/p$ where $\sigma^0$ is the desired standard deviation when the neighboring corner is very close to the segment under consideration.

Several observations can be made for the function defined in equation (11). First, when d is small, $\sigma(d) \approx \sigma^0$ which is the desired standard deviation when neighboring segments are close. Second, when d is much larger than $\tau$, $\sigma(d) \approx p/\sqrt{2\pi}$. In this case, $N_z(0, \sigma^2 I_2) \approx 1/p^2$, indicating that the probabilistic density function approaches to a uniform distribution, and provides no information about the similarity between the pair of line segments. Third, the intermediate value of $\sigma(d)$ varies smoothly between the above two extreme cases. As a consequence, of the second point above, when all the distance measurements $\{d_j | \epsilon [1, \ldots K]\}$ are much larger than $\tau$, the likelihood function in equation (10) is approximately a constant $1/p^2$. As a result, if all the other corners are far from the current curve $\theta_i$, from equation (6), it follows that $p(\theta_i = \omega_\alpha | x_i^{(\alpha)}) = \hat{p}(\theta_i = \omega_\alpha)$. As such, improvement of the labeling probability is questionable when the guidance from neighboring corners is weak.

The adjustment of the parameter $\tau$ depends on the type of the scene in question. If the scene is close to the camera, there is a severe perspective distortion, and $\tau$ needs to be small enough to discard the support from curves far away. On the other hand, if the scene is far from the camera, $\tau$ could be large in order to include support from as many neighboring curves as possible.

C. Preprocessing

In the present invention, it is assumed that in computing the measurements, a curve is approximated by a piece-wise linear model with line segments. A preprocessing technique described below can be used to ensure that the measurements are computed with a curve approximated by a piece-wise linear model (high curvature breaking). It should be noted that any suitable technique can be used to achieve the above.

1. High curvature breaking

Figure 6:
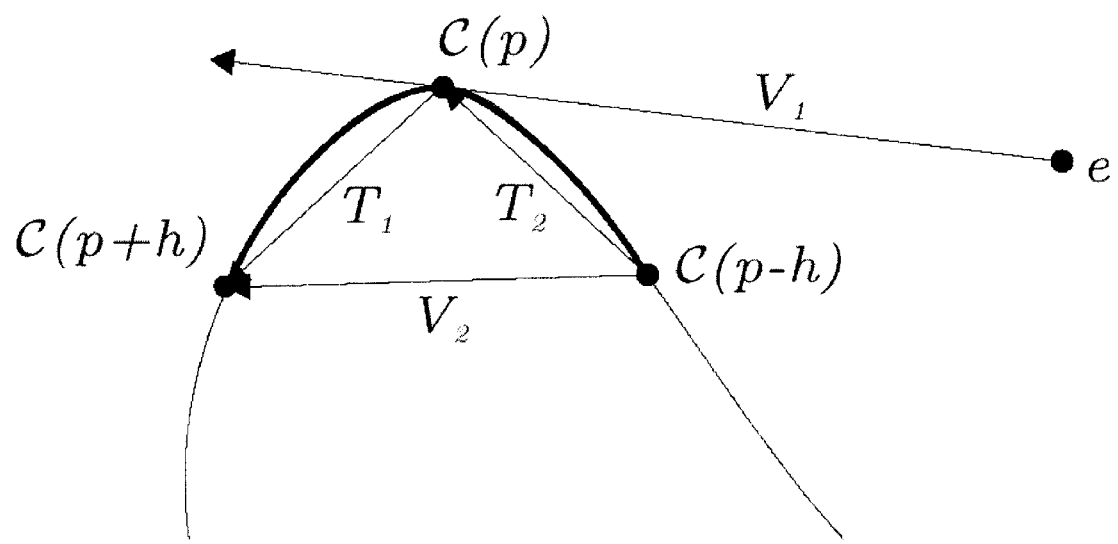
FIG. 6 is a computation of the high curvature and the epipolar breakpoint of the working example of FIG. 4 in accordance with the present invention.

FIG. 6 is a computation of the high curvature breakpoint of the working example of FIG. 4 in accordance with the present invention. In order to have a good piecewise linear approximation to a curve, it is necessary to break the curve at points with high curvature. The high curvature breaking technique works in a very similar way as the epipolar breaking technique described in U.S. patent application Ser. No. 09/584,013, filed concurrently herewith, by Zhang et al., and assigned to the same assignee, entitled "A SYSTEM AND METHOD FOR MATCHING CURVES OF MULTIPLE IMAGES REPRESENTING A SCENE", which is incorporated herein by reference. For instance, the curvature is approximated by $$\mathcal{K}_p = \frac{\|\tilde{\mathcal{T}}_1 - \tilde{\mathcal{T}}_2\|}{\|\mathcal{T}_1\| + \|\mathcal{T}_2\|} \quad (22)$$

where $T_1 = C(w_p(h)) - C(w_p(0))$, $T_2 = C(w_p(0)) - C(w_p(-h))$, and $\tilde{T}_j$ denotes the normalized vector of $T_j$. The original edge chain is broken at point p if its curvature $K_p$ is the local maxima and is larger than a predefined threshold (0.85 in one implementation).

VI. Conclusion

The present invention performs corner guided curve matching within a probabilistic relaxation framework for determining a geometrical representation of a scene. In other words, the curve matching system and method of the present invention is guided by a set of matched corners. Within a probabilistic framework, the role of the corner guidance is explicitly defined by a set of similarity-invariant unary measurements and by a similarity function. The similarity function provides stronger capability of resolving matching ambiguity than the epipolar constraint, and is integrated into a relaxation scheme to reduce computational complexity and improve curve matching accuracy.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for matching line segments defining a first set of curves and corners of a first image to a second set of curves and corners of a second image, comprising:
    computing a set of similarity-invariant unary measurements and a similarity function for determining corner guidance;
    defining the similarity function between two curves in a measurement space; and
    matching line segments of the first image to corresponding line segments of the second image wherein the unary measurements are related to a distance from a corner to a curve of the image, and are used to control corner guidance on curve matching.

2. The method of claim 1, wherein the unary measurements are computed by approximating the curves with a set of line segments connected by separated seed points and obtaining the seed points in the first image by intersecting epipolar lines of the seed points of the first image with the curve to be matched to the second image.

3. The method of claim 1, wherein a corner is defined as a neighbor of a curve if its distance to the curve is less than a predefined threshold.

4. The method of claim 1, wherein a distance from a corner to a curve is defined by the minimum distance from the corner to midpoints of all line segments on the curve.

5. The method of claim 1, wherein an uncertainty of each unary measurement is related to the distance from a corner to a curve.

6. The method of claim 1, wherein the unary measurements include conventional quantities including at least one of neighborhood intensity, orientation, or local shape characteristics.

7. The method of claim 1 wherein a set of uncertainty measurements for the unary measurements is used to compute an optimal unary measurement for a complete curve and to control the impact of corner guidance on curve matching.

8. The method of claim 1, wherein the method operates in a computer readable medium.

9. A method for matching a first set of curves and corners of a first image to a second set of curves and corners of a second image, comprising:
    defining line segments for the first set of curves and corners and for the second set of curves and corners;
    determining corner guidance characteristics from a set of similarity-invariant unary measurements and a similarity function that is defined between two curves in a measurement space; and
    matching line segments of the first image to corresponding line segments of the second image based on the corner guidance wherein the unary measurements are related to a distance from a corner to a curve of the image, and are used to control corner guidance with respect to curve matching.

10. The method of claim 9, wherein a distance from a corner to a curve is defined by the minimum distance from the corner to midpoints of all line segments on the curve.

11. The method of claim 9, wherein a corner is defined as a neighbor of a curve if its distance to the curve is less than a predefined threshold.

12. The method of claim 9, wherein predefined parameters of each unary measurement is related to the distance from a corner to a curve.

13. The method of claim 9, further comprising approximating the curves with a set of line segments connected by equally separated seed points.

14. The method of claim 13, further comprising obtaining the seed points in the first image by intersecting epipolar lines of the seed points of the first image with the curve to be matched to the second image.

15. The method of claim 9, wherein the unary measurements are represented by at least one of neighborhood intensity, orientation, or local shape characteristics.

16. The method of claim 9, further comprising using a set of uncertainty measurements for the unary measurements.

17. The method of claim 16, further comprising, computing an optimal unary measurement for a complete curve and controlling corner guidance with respect to curve matching.

18. A method for matching curves and corners of a first image to curves and corners of a second image, comprising:

approximating the curves with a set of line segments connected by seed points that are separated by a predetermined distance;

obtaining the seed points in the first image by intersecting epipolar lines of the seed points of the first image with the curve to be matched to the second image;

determining corner guidance characteristics from a set of similarity-invariant unary measurements and a similarity function that is defined between two curves in a measurement space; and matching line segments of the first image to corresponding line segments of the second image based on the corner guidance.

19. The method of claim 18, wherein a corner is defined as a neighbor of a curve if its distance to the curve is less than a predefined threshold.

20. The method of claim 18, wherein the distance from a corner to a curve is defined by the minimum distance from the corner to midpoints of all line segments on the curve.

21. The method of claim 18, further comprising determining a distance from a corner to a curve and relating the distance as an uncertainty value for each unary measurement.

22. The method of claim 18, wherein the unary measurements include neighborhood intensity.

23. The method of claim 18, wherein a set of uncertainty measurements for the unary measurements is used to compute an optimal unary measurement for a complete curve.

* * * * *

UNITED STATES PATENT AND TRADEMARK OFFICE
CERTIFICATE OF CORRECTION

PATENT NO. : 6,665,440 B1
DATED : December 16, 2003
INVENTOR(S) : Zhang et al.

It is certified that error appears in the above-identified patent and that said Letters Patent is hereby corrected as shown below:

<u>Column 1,</u>
Line 18, "comer" should be changed to -- corner --

<u>Column 6,</u>
Line 60, "comer" should be changed to -- corner --

<u>Column 7,</u>
Line 61, equation should appear as follows:

$$p^{(n+1)}(\theta_i = \omega_{\theta_i}) = \frac{P^{(n)}(\theta_i = \omega_{\theta_i}) Q^{(n)}(\theta_i = \omega_{\theta_i})}{\sum_{\omega_\lambda \in \Omega} P^{(n)}(\theta_i = \omega_\lambda) Q^{(n)}(\theta_i = \omega_\lambda)} \quad (4)$$

<u>Column 8,</u>
Line 40, "$x_i^{(\alpha)}(\alpha \in M_o)$" should be changed to -- $x_i^{(\alpha)}\ \alpha \in M_o)$ --
Line 41, "$^i$th" should be changed to -- ith --
Line 51, equation should appear as follows:

$$P(\theta_j = \omega_\beta \mid \{x_j^{(\beta)} \mid \beta \in M_o\}) = P(\theta_j = \omega_\beta \mid x_j^{(\beta)})$$

<u>Column 10,</u>
Line 34, equation should appear as follows:

$$\tilde{\sigma}^2 = \varsigma_1^2 \sigma_1^2 + \cdots + \varsigma_K^2 \sigma_K^2 \quad (9)$$

Line 65, equation should appear as follows:

$$\gamma = \sqrt{2\pi} \sigma^0 / p$$

UNITED STATES PATENT AND TRADEMARK OFFICE
CERTIFICATE OF CORRECTION

PATENT NO.     : 6,665,440 B1
DATED          : December 16, 2003
INVENTOR(S)    : Zhang et al.

It is certified that error appears in the above-identified patent and that said Letters Patent is hereby corrected as shown below:

Column 11,
Line 11, "$\{d_j | \in [1,...K]\}$" should be changed to -- $\{d_j | j = \in [1,...K]\}$ --

Signed and Sealed this

Ninth Day of March, 2004

JON W. DUDAS
*Acting Director of the United States Patent and Trademark Office*